June 16, 1953     O. C. KINDORF     2,642,243
CLAMP FOR HANGING PIPE AND THE LIKE
Filed Feb. 19, 1951
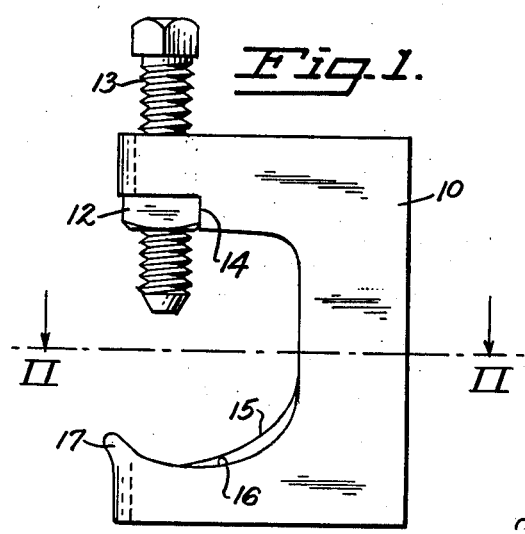
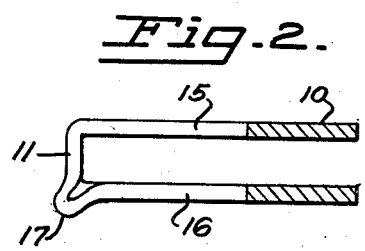
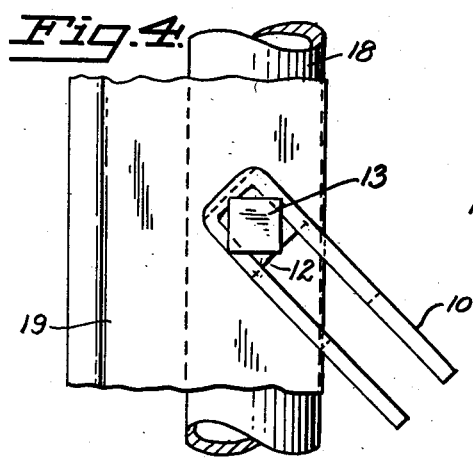
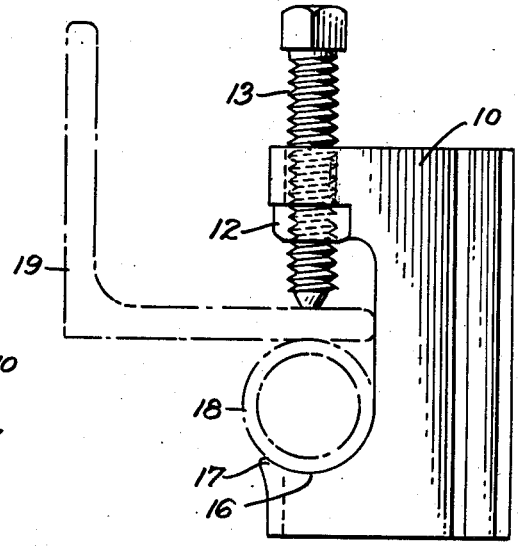
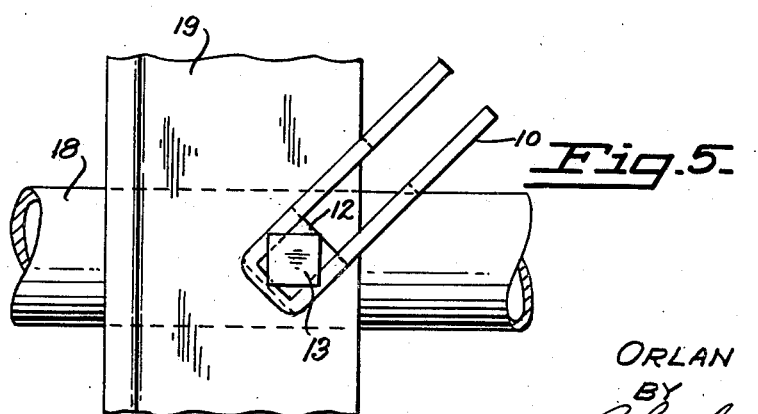
INVENTOR
ORLAN C. KINDORF
BY
Charles M. Fryer
ATTORNEY Patented June 16, 1953

2,642,243

UNITED STATES PATENT OFFICE 2,642,243

CLAMP FOR HANGING PIPE AND THE LIKE

Orlan C. Kindorf, San Francisco, Calif.

Application February 19, 1951, Serial No. 211,744

2 Claims. (Cl. 248—72)

1

The present invention relates to clamps for securing pipe or conduit directly against a structural beam.

When it is desired to hang pipe parallel to the edge of a beam flange, a common C-clamp with a saddle part contoured to embrace one side of the pipe constitutes an adequate support. Such a clamp, however, is incapable of hanging a pipe line transverse to the beam. Clamps have been developed with a saddle part arranged at a diagonal so that by placing the clamp in one diagonal position relative to the beam, a parallel support is provided while in another diagonal position a transverse support is provided as will become more clear from the following description. These clamps are customarily made of forgings or castings which must be drilled or tapped to receive a clamping screw and are relatively costly to manufacture.

In my co-pending application entitled C-clamp, Serial No. 189,152, filed October 9, 1950, I have disclosed a C-clamp made of a simple piece of steel plate bent and punched and capable of employing a standard inexpensive nut and bolt in place of the usual clamping screw. The present application embodies some of the features of said co-pending application and also provides the equivalent of a diagonal saddle in the same simple and inexpensive C-clamp structure.

It is the object of the present invention to provide a C-clamp capable of being manufactured from steel plate or the like by a few simple punch press operations and including in its structure a diagonal saddle for supporting pipe or conduit. Further and more specific objects and advantages of the invention are made apparent in the following specification wherein the invention is described in detail by reference to the accompanying drawings.

In the drawings:

Fig. 1 is a view in side elevation of a clamp embodying the present invention;

Fig. 2 is a sectional view taken on the line II—II of Fig. 1;

Fig. 3 is a diagonal elevational view of the same clamp illustrating a beam and pipe in broken lines;

Fig. 4 is a plan view of the same clamp showing the manner in which it is used to secure a pipe line in a position parallel to a structural beam; and Fig. 5 is a similar view showing the use of the clamp in securing a pipe line transversely of the same kind of beam.

Figs. 1 and 2 of the drawing illustrate the clamp of the present invention as being formed of a single plate of steel or the like bent centrally of itself to provide two side walls 10 and a connecting edge 11. The plate is perforated as by a punch press operation in a manner to intercept the connecting edge 11 and provide the usual C-shape of a clamp of this kind. The punched out area is shaped to provide a relieved area for the reception of a nut 12 through which a clamping screw 13 is threaded and the relieved area has shoulders as indicated at 14 which prevent rotation of the nut when the clamping screw is turned. The punched out area is symmetrical on both of the side walls 10 with the exception of that part directly beneath the clamping screw where the edges illustrated at 15 and 16 and a flared corner part 17 are cut on curves corresponding to the wall of a cylinder intercepting the clamp at a diagonal position. Thus when the clamp is viewed from a corresponding diagonal position which is preferably 45° as illustrated in Fig. 3 of the drawings, the curved edges 15 and 16 cooperate to form a saddle for a cylindrical pipe or conduit shown in broken lines at 18. With this pipe in direct contact with a flange of a beam, also shown in broken lines at 19, the clamping screw 13 may be brought to bear against the opposite side of the flange for securing the pipe in place.

Because of the diagonally arranged saddle part of the clamp, it may be employed as illustrated in Fig. 4 to clamp the pipe 18 parallel to the direction of the beam 19, and this is accomplished by disposing the clamp at a diagonal or 45° angle with respect to the edge of the beam as shown. By reversing the diagonal position of the clamp to that shown in Fig. 5, its saddle part will occupy a position to support the pipe 18 extending transverse to the direction of the beam 19.

It is most desirable, in order to obtain a simple structure at low cost, that the clamping screw 13 occupy a position substantially tangent to both of the side walls 10 as well as to the connecting edge 11. To accomplish this and also to accomplish the desirable centering of the clamping screw 13 over the position occupied by the pipe 18, it is necessary to extend the edge 16 somewhat beyond the limits of the steel plate which has been bent in the manner described. This is done by swedging out the portion 17 as shown in Figs. 1, 2 and 3. As the swedged out part 17 is employed together with the edge 16 to provide a contour corresponding to the diagonal interception of a cylindrical surface, the original punching operation on the steel plate does not produce the exact contour required. It is the final displacement of the metal forming the part 17 that produces the required contour.

Since steel plate is inherently stronger and less costly than castings or forgings of comparable weight, the clamp of the present invention is relatively inexpensive to manufacture and it may also be produced rapidly and at low cost because of the fact that the entire body member is made from simple punch press operations.

I claim:

1. A clamp for securing pipe or the like against a beam flange which comprises a pair of spaced plates, an integral part joining one edge of the plates to hold them in spaced relation, said plates having a cut-out portion extending through their joined edges and the joining part, said cut-out portion having dissimilar curved edges on each of the plates to correspond to the diagonal interception of a cylinder with the plates to provide a saddle for a pipe extending diagonally through the clamp, and a clamping screw disposed between said spaced side plates adjacent said joining part in a position with its axis adapted to intersect a pipe resting in said saddle.

2. A clamp for securing pipe or the like against a beam flange which comprises a pair of spaced plates, an integral part joining one edge of the plates to hold them in spaced relation, said plates having a cut-out portion extending through their joined edges and the joining part, said cut-out portion having dissimilar curved edges on each of the plates to correspond to the diagonal interception of a cylinder with the plates to provide a saddle for a pipe extending diagonally through the clamp, a clamping screw disposed between said spaced side plates adjacent said joining part in a position with its axis adapted to intersect a pipe resting in said saddle, and a projection at the juncture of one side plate and said joining part to extend one of said curved edges outwardly beyond the joining part.

ORLAN C. KINDORF.

References Cited in the file of this patent

UNITED STATES PATENTS

| Number | Name | Date |
| --- | --- | --- |
| 1,747,005 | Hawthorne et al. | Feb. 11, 1930 |
| 1,794,976 | Mueller | Mar. 3, 1931 |
| 2,163,635 | Shea | June 27, 1939 |
| 2,562,562 | Manasek | July 31, 1951 |